United States Patent [19]

Landmark et al.

[11] 4,376,602
[45] Mar. 15, 1983

[54] METHOD AND EQUIPMENT FOR REMOVING PACKING COKE FROM BAKING CHAMBERS FOR CARBON BODIES

[75] Inventors: Jonas R. Landmark, Hosle; Paul A. Schneider, Oslo, both of Norway

[73] Assignee: Ardal og Sunndal Verk a.s., Oslo, Norway

[21] Appl. No.: 192,022

[22] Filed: Sep. 29, 1980

[51] Int. Cl.³ ............................................. B65G 53/24
[52] U.S. Cl. ..................................... 406/115; 15/301; 55/356; 55/467; 285/151; 285/188; 406/151
[58] Field of Search ..................... 406/12, 39, 113–116, 406/151, 152; 104/23 FS, 157–160; 55/356, 467; 285/151, 188; 15/300 R, 301, 312 R

[56] References Cited

U.S. PATENT DOCUMENTS

| | | | |
|---|---|---|---|
| 2,634,560 | 4/1953 | Ramm | 15/312 R X |
| 3,018,503 | 1/1962 | Hijiya et al. | 15/301 X |
| 3,540,378 | 11/1970 | Giraud | 104/23 FS |

FOREIGN PATENT DOCUMENTS

| | | | |
|---|---|---|---|
| 685772 | 11/1939 | Fed. Rep. of Germany | |
| 1077718 | 8/1967 | United Kingdom | 15/312 R |

*Primary Examiner*—Jeffrey V. Nase
*Attorney, Agent, or Firm*—Wenderoth, Lind & Ponack

[57] ABSTRACT

A system for removing packing coke from baking chambers of a furnace for baking carbon bodies includes a crane mounted for movement along a rail, a silo supported by the crane, a suction tube connected to the silo and insertable into packing in a furnace baking chamber, and structure for supplying vacuum to the suction tube to remove the packing coke therethrough from the chamber into the silo. The vacuum structure includes a closed vacuum duct extending parallel to the rail, the vacuum duct having an upper slide surface and a plurality of valves spaced along the slide surface. A stationary vacuum source is connected to the vacuum duct and creates therein a vacuum. A sliding box is supported by the crane and is movable thereby along the vacuum duct over the valves on the slide surface. Each valve is openable by a respective pneumatic cylinder. An activating rail is mounted on the sliding box and is operable upon movement of the sliding box along with vacuum duct to activate the pneumatic cylinders to open respective valves, thereby communicating the vacuum from the stationary vacuum source through the vacuum ducts, the opened valves and the sliding box to the silo and the suction tube. The sliding box has supporting wheels rolling on the vacuum duct and guide wheels positioning the sliding box on the vacuum duct. The sliding box has a sliding gasket sealingly contacting the slide surface. The sliding gasket includes a rubber skirt into which is fitted an elastic gasket of a material with a low coefficient of friction and sliding along the slide surface.

1 Claim, 4 Drawing Figures

METHOD AND EQUIPMENT FOR REMOVING PACKING COKE FROM BAKING CHAMBERS FOR CARBON BODIES

BACKGROUND OF THE INVENTION

This invention relates to systems including cranes for use in connection with furnaces for baking or calcining carbon bodies, which bodies are to be used in furnaces for electro-thermal processes or in cells for the electrolytic reduction of metal oxides to metals. More specifically, the invention relates to a structure for drawing off, by suction, coke from a so-called ring-chamber baking furnace.

In the following, by way of example, the invention will be described as applied in connection with the production of carbon bodies for the electrolytic reduction of alumina to aluminum, but it will be understood that the apparatus can be applied to the production of carbon bodies for other processes as mentioned above.

The carbon bodies which are used in cells for producing aluminum are made from a mixture, or paste, consisting of calcined antracite, petroleum coke and pitch, in proportions varying with the raw materials and the purpose which the carbon body is to serve. The pitch acts as a binding agent.

Carbon bodies for use in furnaces for electro-thermal processes, in linings and/or as electrodes, are made from other mixtures, but along the same principles.

As it comes out of the mixing machine, this paste is firm at room temperature, becomes softer around 100°–150° C., and at higher temperatures the volatile components will be driven off and the binding agent carbonized, whereby the paste becomes stiff and hard. This thermal treatment is referred to as baking. The baking of, for example, an anode in an electrolytic reduction cell can be effected by the heat generated by the process, but today it is normally preferred to perform this baking in separate furnaces, as this allows better control over the baking process and thus the properties of the finished product.

The carbon bodies which are placed into a furnace of this type for baking are often referred to as "green carbons" (in which "green" indicates that they are "unripe"). The green carbons are produced by pressing or vibrating, and can be of considerable size. Cathode carbons, for electrolytic reduction cells for producing aluminum, for example, can measure 700×900×4000 mm, and weigh some 4 tonnes. It is clear that when such a body is heated up and passes through a temperature zone in which it becomes soft, it will become deformed unless special steps are taken. For this reason, the green carbons are placed in high pits in the chambers, which pits are built of refractories, and the space between the carbons and the pit walls are filled with coke breeze, which will also protect the green carbons against combustion.

A certain number of pits form a chamber, and a number of chambers are built together to form a ring furnace with or without a separate lid over each chamber. The following description is based on a ring-chamber furnace with lids, but the equipment can also be used in connection with ring-chamber furnaces without lids.

Hot combustion gases are led into a chamber. They flow through hollow refractory pit walls and from there on to the next chamber. The firing zone moves through the entire furnace, thereby making the best possible use of the heat. The baking of the green carbons is completed successively, and the chambers containing the finished carbons must be allowed to cool for some time before the packing coke can be removed and the finished carbons lifted out. During baking, the temperature reaches 1280° C., and the entire cycle takes about three weeks.

Ring-chamber furnaces are large. Cranes over such furnaces can, for example, have a reach of over 30 meters, and the plant is expensive. It is therefore necessary to make effective use of expedient aids.

The physical work involved in operating a ring-chamber furnace refers mainly to the emptying of the chambers at the end of the cycle, and filling the chambers with green carbons and packing coke for the next cycle.

The emptying of the chambers is started by lifting off the lid of the individual chamber, and then drawing off the packing coke by suction in order to gain access to the baked carbon.

The drawing-off of the packing coke is usually performed by lowering a suction tube down into the packing coke. This tube is normally suspended from a crane and is telescopically connected with a silo and a suction connection (fitting) on the crane bridge. The tube is lowered down into the loose coke mainly by its own weight, and is often guided manually by handles welded on to the tube.

In a fairly large baking furnace, with an annual capacity of 36,000 tonnes of calcined carbon bodies, it is necessary to draw off daily some 33 tonnes of packing coke which has a temperature of some 250° C.

A previous method of doing this was based on a vacuum line installed around the furnace to which a flexible hose could be connected. This hose was connected to a transportable container, which in turn was connected to a suction tube which the operator lowered down into the pit to be emptied. The container had a capacity of some 5 tonnes of coke, and when it was full, it was taken away by crane for emptying.

SUMMARY OF THE INVENTION

The inventors have found that the whole of this operation can be made more efficient by installing the container—a silo—under the crane which is connected to a vacuum plant. When the silo is full, the crane can be driven over to a pit which is to be filled with coke, and the coke released down through bottom tapping. If the crane has a vacuum plant, an excellent exhaust draft can be established around the exit orifice, thus drawing off any coke dust caused by this emptying process.

A vacuum pump with the required capacity, together with a centrifuge to remove coke dust from the hot transport air proved such a large installation that it was not possible in practice to mount this on the crane bridge.

Several possibilities for connecting the vacuum system on the movable crane bridge to a stationary vacuum center in the building were tested until the final solution was found.

In principle, the arrangement consists of a sliding box, flexibly mounted on the crane bridge, which box, which is open at the bottom, slides on top of a fixed vacuum duct or line which runs parallel with the crane bridge track. The vacuum line is equipped with valves which are opened automatically by the sliding box, and in this manner the sliding box is always connected to the vacuum line through at least one orifice. The valves are closed automatically when the sliding box is driven away from them.

BRIEF DESCRIPTION OF THE DRAWINGS

The system of the invention will be described below in more detail with reference to the accompanying drawings.

DETAILED DESCRIPTION OF THE INVENTION

Figure 1:
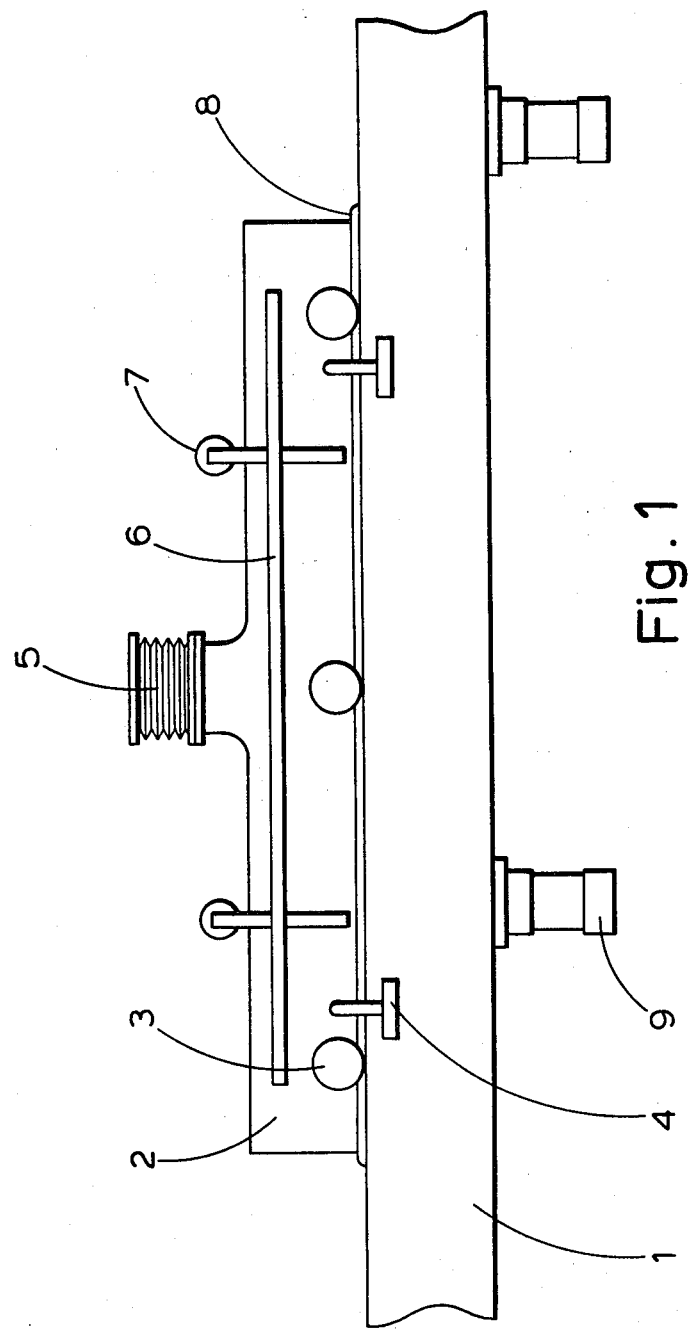
FIG. 1 is an elevation view showing the sliding box over the vacuum line, seen across its direction of travel.

In FIG. 1, 1 is a vacuum line, 2 is a sliding box, 3 are supporting wheels to prevent the box from being clamped by vacuum against the vacuum line, 4 are guiding wheels to hold the box in position, 5 is a flexible coupling which connects the sliding box on the vacuum line (duct) to cyclone(s) and a silo 12 on a crane 15, 6 is an activating rail for vacuum valves, 7 are activators for the activating rail, 8 is a sliding gasket and 9 are cylinders for opening and closing the vacuum valves.

Figures 2, 2A:
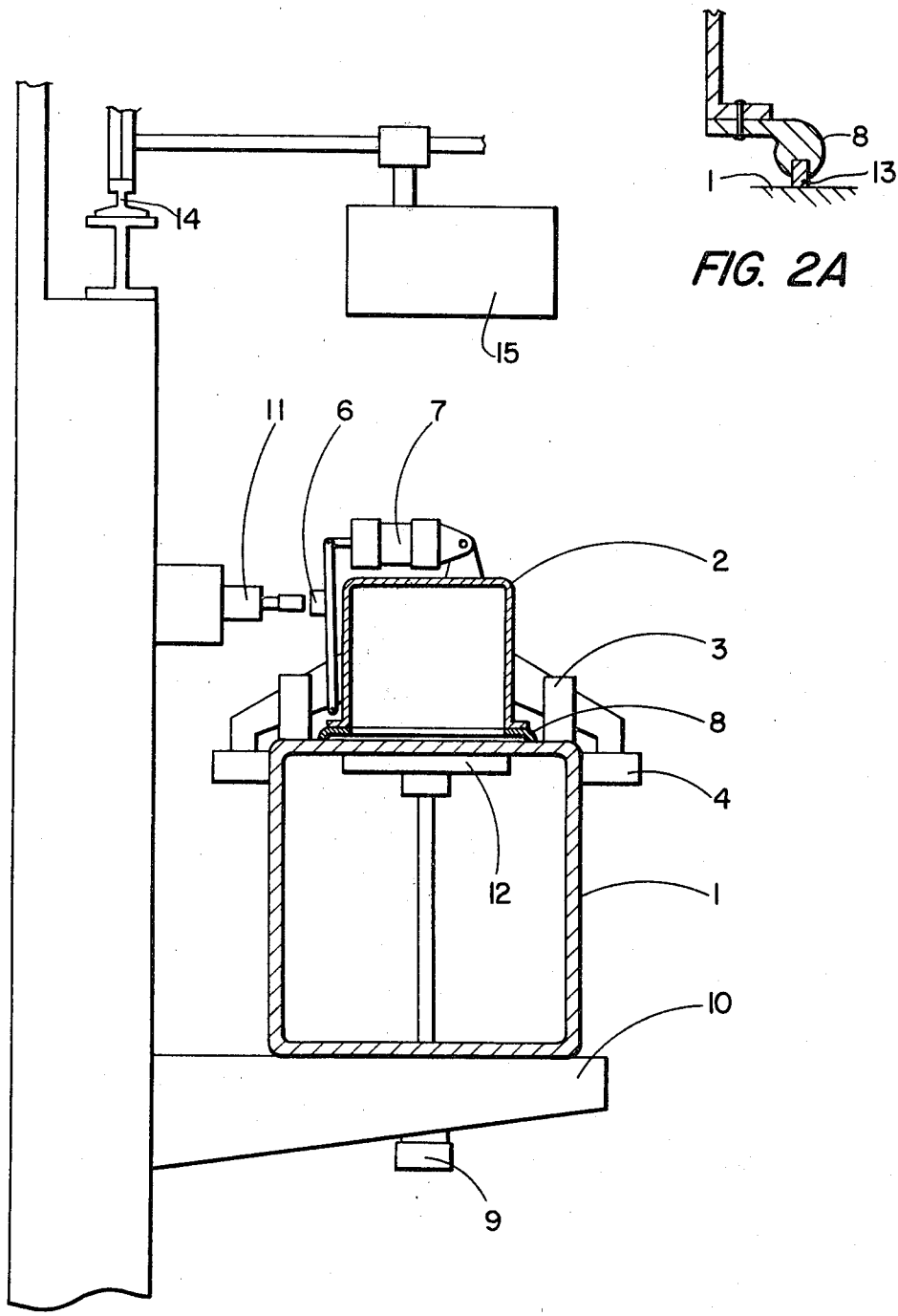
FIG. 2 is a section of the vacuum line and the sliding box.
FIG. 2A is an enlarged partial section showing sealing of the sliding box to the top of the vacuum line.

FIG. 2 is a section of the sliding box 2 above the vacuum line 1, which is mounted on a bracket 10. Also shown are the supporting wheels 3 and guiding wheels 4 on the sliding box 2, which is sealed by means of the sliding gasket 8 consisting of a rubber skirt into which is inserted an elastic gasket 13 of a material with a low coefficient of friction and which slides along vacuum duct 1. Similarly shown is one of the activators 7 which activates the activating rail 6. This activating rail will, in its activated state, activate control valve 11, which in turn activates the pneumatic cylinder 9. When this cylinder 9 is activated, it will open valve 12, whereby the vacuum system on the crane bridge 15 is connected to a stationary vacuum plant 17 which is connected to vacuum line 1.

Activating rail 6 is made long enough to ensure that it will operate at least one vacuum valve, ensuring that vacuum will always be connected by the crane driver through activator 7. When the crane is driven away, the vacuum valve(s) which has (have) been opened will be automatically closed.

The supporting wheels 3 are necessary, as they prevent the sliding box from being clamped firmly to the vacuum line 1, while the sliding gasket 8 ensures a vacuum-tight connection between the sliding box and the vacuum line.

In FIG. 2, crane 15 is shown schematically only and runs on a rail 14 extending parallel to vacuum line 1.

Figure 3:
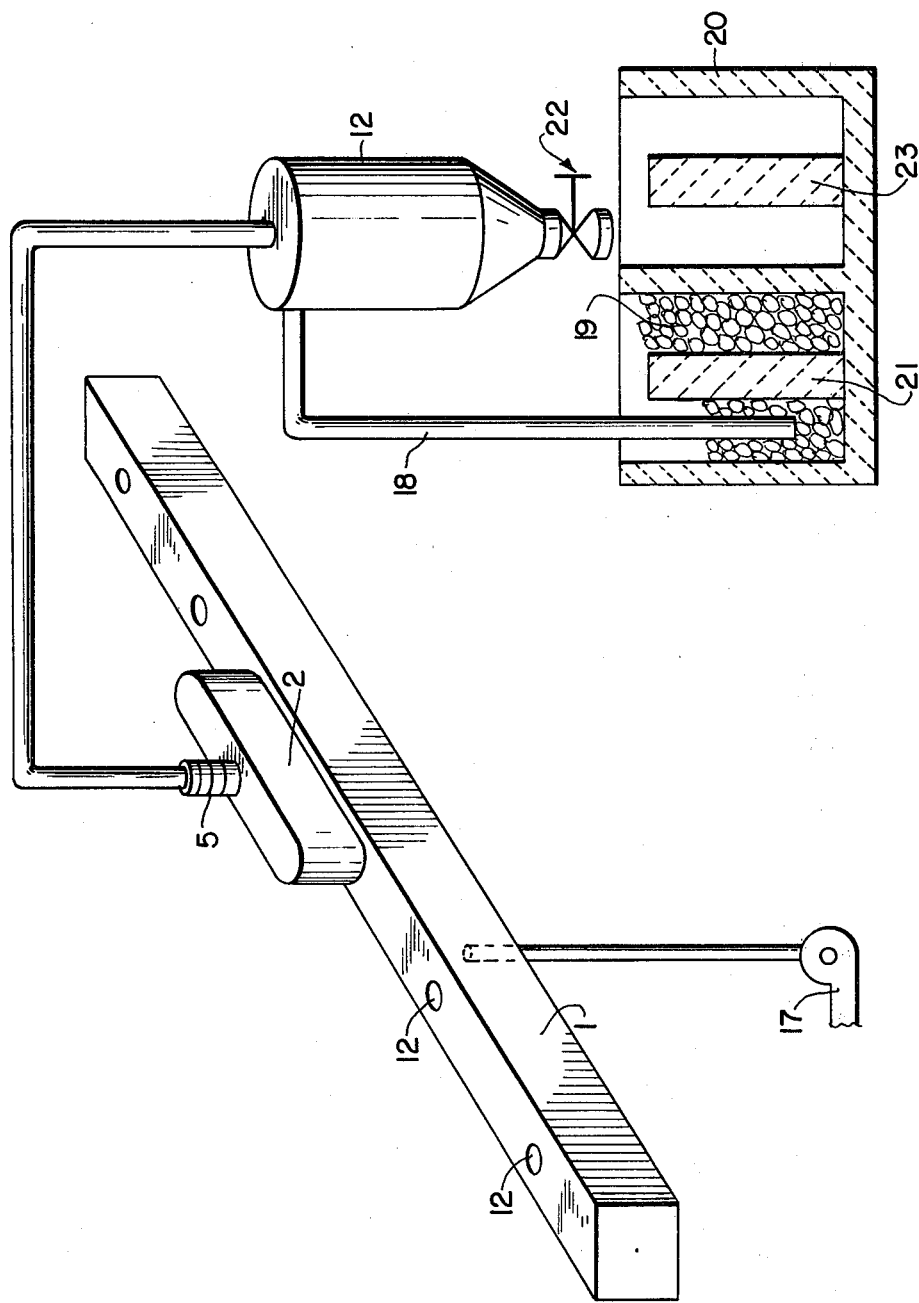
FIG. 3 is a schematic perspective view of the overall plant.

Crane 15 supports sliding body 2 in a conventional manner and also supports silo 12, shown schematically in FIG. 3. Silo 12 supports a suction tube 18 which is extendable into loose coke 19 in one pit or chamber in a furnace 20 containing baked carbon 21. Suction from sliding box 2, silo 12 and suction tube 18 draw this loose coke into silo 12. A valve 22 on silo 12 enables coke therein to be filled into another pit or chamber of the furnace containing green anodes 23. In the drawings, the structure of the crane, the silo, the furnace, the suction tube and the stationary vacuum plate have been shown schematically only, since such elements and the manner of connection and support therebetween may be conventional.

We claim:

1. In a system for removing packing coke from baking chambers of a furnace for baking carbon bodies, said system including a crane mounted for movement along a rail, a silo supported by said crane, a suction tube connected to said silo and insertable into packing coke in a furnace baking chamber, and means for supplying vacuum to said suction tube to remove said packing coke therethrough from said chamber into said silo, the improvement wherein said vacuum supplying means comprises:

a closed vacuum duct extending parallel to said rail, said vacuum duct having an upper slide surface, and a plurality of valves spaced along said slide surface;

a stationary vacuum source connected to said vacuum duct and creating therein a vacuum;

a sliding box supported by said crane and movable thereby along said vacuum duct over said valves on said slide surface;

means for connecting the interior of said sliding box to said silo;

each said valve being openable by a respective pneumatic cylinder;

an activating rail mounted on said sliding box and operable upon movement of said sliding box along said vacuum duct to activate said pneumatic cylinders to open respective said valves, whereby vacuum from said stationary vacuum source is communicated through said vacuum duct, the opened said valves, said sliding box, said connecting means and said silo to said suction tube;

said sliding box having supporting wheels rolling on said vacuum duct and guide wheels positioning said sliding box on said vacuum duct; and said sliding box having a sliding gasket sealingly contacting said slide surface of said vacuum duct, said sliding gasket comprising a rubber skirt into which is fitted an elastic gasket of a material with a low coefficient of friction and sliding along said slide surface.

* * * * *